United States Patent [19]

Chew et al.

[11] 4,157,927

[45] Jun. 12, 1979

[54] AMINE-BORANES AS HYDROGEN GENERATING PROPELLANTS

[75] Inventors: William M. Chew, Fullerton, Calif.; James A. Murfree; Pasquale Martignoni, both of Huntsville, Ala.; Henry A. Nappier, Laceys Spring, Ala.; Orval E. Ayers, Huntsville, Ala.

[73] Assignee: The United States of America as represented by the Secretary of the Army, Washington, D.C.

[21] Appl. No.: 883,630

[22] Filed: Mar. 6, 1978

[51] Int. Cl.$^2$ .............................................. C06B 43/00
[52] U.S. Cl. ................................. 149/22; 149/109.2; 423/286; 423/648 R; 423/648 A
[58] Field of Search ............................ 149/22, 109.2; 423/648 R, 648 A, 286

[56] References Cited

U.S. PATENT DOCUMENTS

| | | | |
|---|---|---|---|
| 3,338,684 | 8/1967 | Fein et al. | 423/286 |
| 3,346,348 | 10/1967 | Lamoria et al. | 423/286 |
| 3,948,699 | 4/1976 | Ayers et al. | 149/22 |
| 4,021,362 | 5/1977 | Channell et al. | 423/648 A |
| 4,061,512 | 12/1977 | Chew et al. | 149/22 |

*Primary Examiner*—Edward A. Miller
*Attorney, Agent, or Firm*—Nathan Edelberg; Robert P. Gibson; James T. Deaton

[57] ABSTRACT

The use of a class or compounds known as amine-boranes and their derivatives in solid propellants to produce or generate hydrogen or deuterium upon combustion.

4 Claims, No Drawings

AMINE-BORANES AS HYDROGEN GENERATING PROPELLANTS

DEDICATORY CLAUSE

The invention described herein may be manufactured, used, and licensed by or for the Government for governmental purposes without the payment to us of any royalties thereon.

BACKGROUND OF THE INVENTION

Various lasers are being developed which require $H_2$ and/or $D_2$ as fuels. Presently, high pressure tank hydrogen and deuterium are being used as sources for these gases. When fully developed and fielded, the lasers cannot use gas storage tanks because of both logistic and safety problems which are inherent with tank stored high pressure hydrogen and deuterium. The most attractive alternative to tank hydrogen is the use of solid propellants which generate hydrogen (deuterium) when ignited and burned. Previous work in this area has involved metal hydrides such as $LiAlH_4$ or $NaBH_4$, mixed with an oxidizer, such as $Fe_2O_3$, $(NH_4)_2SO_4$, or $(NH_4)_2Cr_2O_7$. These formulations give either pure hydrogen or a combination of hydrogen and nitrogen, and the nitrogen is used as a laser diluent. Minor byproducts from the combustion of these solids should not be laser deactivators. Even in light of the previous work, there is still a need for a solid propellant gas generator that produces or gives off a greater weight percentage of hydrogen or deuterium.

Therefore, an object of this invention is to provide a solid propellant composition capable of generating hydrogen or hydrogen and non-deactivating diluents and/or byproducts that have a much greater weight percentage of hydrogen.

Another object of this invention is to provide a composition and a method for producing deuterium or a mixture of deuterium and non-deactivating diluents and/or byproducts in which the deuterium is of a much greater weight percentage than previous work in this area.

Other objects and advantages of this invention will be obvious to those skilled in this art.

SUMMARY OF THE INVENTION

In accordance with this invention, it has been discovered that the class of compounds known as amine-boranes and their derivatives are well suited for use in generating hydrogen or deuterium. The compounds of amine-boranes and their derivatives are mixed with heat producing compounds such as lithium aluminum hydride or a mixture, such as $NaBH_4/Fe_2O_3$ mixtures in definite proportions in a mixer or ball mill to produce a uniform mixture. The mixed powder is then pressed into pellets and ignited to produce the hydrogen or deuterium as well as byproducts that are non-deactivating diluents.

DESCRIPTION OF THE PREFERRED EMBODIMENT

It has been discovered that the class of compounds known as amine-boranes and their derivatives are well suited for use in generating hydrogen or deuterium. These compounds have the generalized formula $B_xN_xH_y$ and have the potential of giving up their hydrogens forming $xBN$ and $y/2H_2$. The simplest known stable compound is ammonia borane, $H_3BNH_3$, an adduct of $NH_3$ and $BH_3$. $NH_4BH_4$ is not stable and looses hydrogen at room temperature. Another known compound is the "diammonate of diborane," $H_2B(NH_3)_2BH_4$. When heated, this compound looses hydrogen to form a polymer, $(H_2BNH_2)_x$ and if heated more strongly will yield borazole, $B_3N_3H_6$ analogous to benzene in structure. This compound can loose additional hydrogen to produce boron nitride, $BN$.

Derivatives of these amine-boranes include such compounds as $H_2B(NH_3)_2X$ (where X is a halogen), metal complexes such as $Cr(NH_3)_6BH_4$, and hydrazine complexes such as $N_2H_4BH_3$.

GENERAL EXAMPLE

A mixture of an amine-borane, or a derivative, and a reactive heat producing compound, such as $LiAlH_4$, or a mixture, such as $NaBH_4/Fe_2O_3$ mixtures, in definite proportions is mixed in a mixer or ball mill until a uniform mixture is obtained. The definite proportions can vary in mole ratio of the borane compound to the heat producing compound or mixture from a mole ratio of about 25 to 1 of the borane compound to the heat producing compound or mixture to a mole ratio of about 1 mole of the borane compound to about 1 to 2 moles of the heat producing compound or mixture. After mixing, the mixed powder is then pressed into pellets using pressure from about 500 to about 10,000 pounds total load. The total gas flow rate released on combustion of the pellets can be adjusted to the desired value by controlling the pellet configuration and the burning rate of the propellant by adjusting the formulation.

The following examples of the specific hydrogen generating propellant formulations are presented. If deuterium is desired, a deuterated amine-borane, $B_xN_xD_y$, or a derivative, can be substituted for the hydrogen containing amine-borane or derivative in each of the examples herein below.

SPECIFIC EXAMPLE I 61.6 g (2 moles) of amine-borane, $H_3BNH_3$, is mixed with an oxidizer of 5.1 g of $Fe_2O_3$ and 1.8 g of $NaBH_4$ (90% be weight amine-borane and 10% by weight oxidizer of $Fe_2O_3$ to the $NaBH_4$) in a blender and mixed. The weight ratio of amine-borane to the oxidizer can vary from about 85% to about 95% of the amine-borane to the oxidizer ingredients of about 5% to about 15%. The mixture is then pressed into a monolithic grain on a pellet press. When the grain or pellet is caused to combust using a nichrome wire (80% Ni and 20% Cr) which is electrically heated and combustion ensues, the grain or pellet produces 12 g of $H_2$ from the amine-borane and 0.09 g from the $Fe_2O_3/NaBH_4$ formulation. This gives a weight efficiency of 17.5% assuming all the hydrogen is given off as molecular hydrogen.

SPECIFIC EXAMPLE II 6.6 g (0.1 mole) of $H_2B(NH_3)_2F$ is mixed with 3.79 g (0.1 mole) of $LiAlH_4$ and pressed into a grain or pellet. When a nichrome wire ignites the pellet the ensuing combustion produces 1.2 g of hydrogen. Assuming the following reaction:

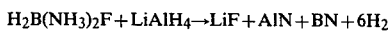

$$H_2B(NH_3)_2F + LiAlH_4 \rightarrow LiF + AlN + BN + 6H_2$$

If a small amount of heat generating substance is desired, the substance can be blended with the other ingredients and will result in slightly lower weight efficiencies than indicated by the above equation (11.6 wt %).

The advantage of the amine-boranes and their derivatives in propellant formulation is one of higher yields of hydrogen/deuterium. These compounds have typical hydrogen weight percent values around 10–15 percent with possibilities to near 20 percent. The $Fe_2O_3$/$NaBH_4$ (⅔ molar ratio) formulation has an efficiency of 2.8 weight percent. Deuterium efficiency is also correspondingly higher. The amine-boranes, therefore, have weight efficiency improvements by a factor of three or more over the present state of the art of hydrogen generators.

We claim:

1. A solid propellant composition in the form of a compacted solid propellant pellet, said solid propellant producing hydrogen or deuterium from a self-sustaining reaction after said reaction is initiated by a heat source sufficient to initiate said reaction, said solid propellant composition comprising a predetermined molar ratio mixture of a first reactant composition and a second reactant composition, said first reactant being selected from the group consisting of amine-boranes and their derivatives, and said second reactant being selected from the group consisting of $LiAlH_4$, $NaBH_4$, $Fe_2O_3$ and mixtures thereof, said first reactant being present in a mole ratio varying from about 1 to about 25, and said second reactant being present in a mole ratio varying from about 1 to about 2.

2. A solid propellant composition as set forth in claim 1, wherein said first reactant is selected from the group consisting of $H_3BNH_3$ and $H_2B(NH_3)_2X$, wherein X is a halogen.

3. A solid propellant composition as set forth in claim 1, wherein said first reactant is $H_3BNH_3$ and said second reactant is a mixture of $Fe_2O_3$ and $NaBH_4$ present in a molar ratio of ⅔, and wherein said first reactant comprises about 90 weight percent of said propellant composition and said second reactant comprising about 10 weight percent of said propellant composition.

4. A solid propellant composition as set forth in claim 1, wherein said first reactant is $H_2B(NH_3)_2F$, and said second reactant is $LLAlH_4$, and said first and second reactants are present in a mole ratio of 1/1.

* * * * *